Dec. 26, 1939. H. S. ELLIOTT 2,184,450
MEAT TENDERER
Filed June 9, 1938
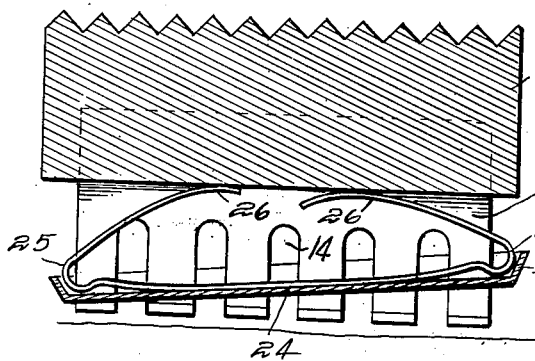
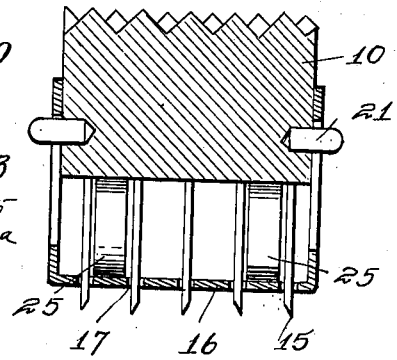
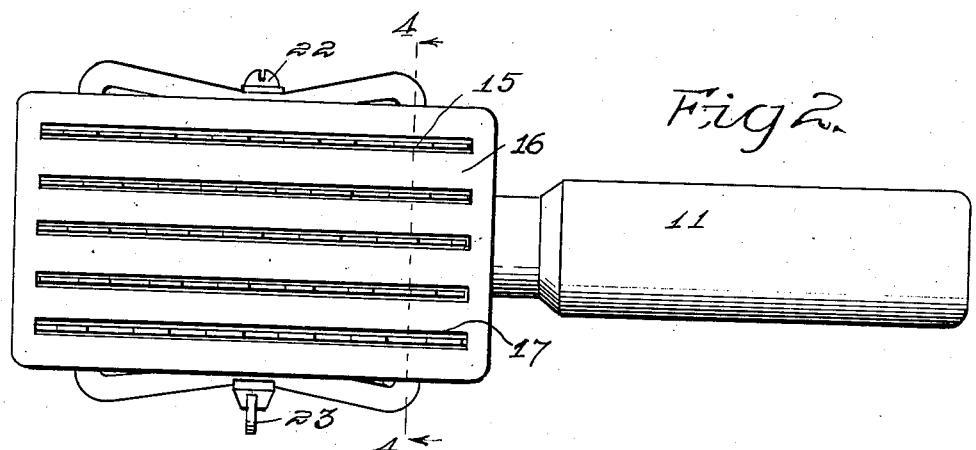
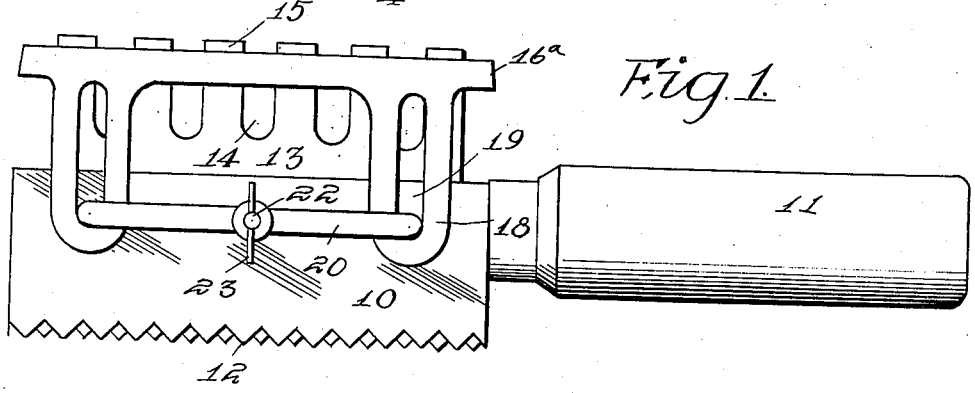
Inventor
Harry S. Elliott.

Patented Dec. 26, 1939

2,184,450

UNITED STATES PATENT OFFICE 2,184,450

MEAT TENDERER

Harry S. Elliott, Des Moines, Iowa

Application June 9, 1938, Serial No. 212,717

2 Claims. (Cl. 17—30)

My invention relates to the art of so-called meat tenderers of the class in which a hammer-like head is provided with a series of blades sharpened at their lower ends for cutting the fibers and tendons of relatively tough meat and making it substantially equivalent to tender meat for purposes of easy mastication.

With tools of this class, and after portions of the meat are cut into small particles, these particles will adhere to the blades and retard further effective operations of the tool.

My object is to provide an automatic stripper for a tool of this class which may be readily, easily and quickly removed for cleaning purposes and replaced and which in use will not in any way impair or retard the cutting action of the blades, and more specifically to provide a stripper device in which either end thereof may move freely toward and from the body of the tool, so that if the blades on either end of the tool should be prevented from penetrating the meat, and the blades on the other end should penetrate, then the stripper will effectively operate to clean the blades which have thus penetrated, and the stripper will not interfere with such penetrating action.

Figure 1 shows a side view of my improved meat tenderer;

Figure 2 shows a plan view of same from the side on which the cutter blades are located;

Figure 3 shows a sectional view of the body portion of my improved meat tenderer; and Figure 4 shows a sectional view on the line 4—4 of Figure 2.

Referring to the accompanying drawing I have used the reference numeral 10 to indicate generally the body portion of my improved meat tenderer having a handle 11 fixed to one end thereof. One face of the body is preferably formed with pointed projections 12 for meat pounding purposes.

On the other side of the body portion there are a series of meat cutting blades formed in a plate 13 provided with slots 14 to form the blades 15. These plates 13 are equally spaced apart.

The meat stripping plate is formed of a single piece of sheet metal and comprises a body portion 16 having slots 17 through which the blades 15 are projected, and also having upwardly extended flanges 16a at its ends, and these slots 17, as clearly shown in Figure 4, are wider than the thickness of the plate, and the meat stripping plate extends laterally beyond the outer sides of the outer blades. Each stripping plate is formed with two arms 18 at each side, formed with slots 19.

For securing the stripper plate to the implement I have provided on each side a metal bar 20 having its ends 21 extended through the slots 19 and into openings formed in the body 10, as shown in Figure 4, and a bolt 22 is extended through the bars 20 and the body 10 and provided with a detachable nut 23 which may be readily and easily removed so that the bars 20 may be removed, and when they are removed the stripper plate is free to be removed for cleaning purposes.

For yieldingly holding the stripper plate at its lower limit of movement I have provided two springs made of flat metal and comprising a body portion 24 shaped to engage and rest upon the upper surface of the meat stripping plate. At the ends of the body portion 24 are the looped portions 25 to engage the flange 16a of the stripper plate to thereby hold the spring against longitudinal sliding movement. The ends of the spring are curved inwardly toward each other at 26 for engaging the lower surface of the body 10, as shown in Figure 3. By means of this construction the springs can obviously be readily and easily removed and replaced, for cleaning purposes.

In practical operation the operator grasps the handle 11 and applies the implement to the meat to be treated with a hammer-like stroke. It frequently happens that all of the blades will not penetrate the meat to the same extent, and when this is done the stripper plate 16 may be tilted upwardly at either end, and when the deepest penetration in the meat has been secured, the stripper plate will engage all portions of the meat being treated, so that when the implement is moved upwardly the blades will not stick in the meat and the meat will be stripped from them without being raised from the block on which the work is being done. The implement should be frequently cleaned, and this can be readily and easily done by simply removing the bolt 22, after which all of the various parts may be readily and easily cleaned and kept sanitary.

In practice it is sometimes desirable to prepare meats by combining, for instance, a steak of relatively lean meat and a quantity of fat meat, and to so intimately combine and mix them that the resultant steak will be like the meat which originally contained the desirable amount of lean and fat.

With the use of my improved implement I accomplish this result as follows: Slices of the relatively fat meat are placed upon the lean meat, and my implement is applied with hammer-like blows. The ends of the cutter blades penetrate the fat meat first and carry with them small fibers of the fat meat down into the openings formed by the blades in the lean meat. When the blades are withdrawn the stripper plate firmly engages all of the upper layers of meat at or near the part of the meat being treated and holds the fat meat firmly against the under layer, regardless of whether or not all of the blades have penetrated the meat to the same extent, hence, these small fibers are held in the cuts of the lean meat and the two layers of meat are what I have described as being sewn together. To accomplish this result it is essential that when the blades are withdrawn no part of the upper layer of meat be elevated above the lower layer, because this would cause said fibers to be withdrawn from the lower layer of meat, and no physical union of the two layers of meat would be made. With my device all portions of the upper layer of meat are always held firmly pressed against the lower layer, and the physical union mentioned is maintained.

I claim as my invention:

1. A meat tenderer comprising a body, cutter blades fixed to the body and arranged in rows spaced apart from each other, and sharpened at their outer ends, a stripper plate formed with slots for receiving said rows of blades and extended beyond the sides and ends of said blades, said stripper plate having arms at its sides extended over the sides of the body and slotted, a connecting bar at each side of the body having its ends extended through the slots in said arms and into the body, means for detachably securing said bars to the body, and means for yieldingly holding the stripper plate away from the body.

2. A meat tenderer, comprising a body, cutter blades fixed to the body and arranged in rows spaced apart from each other, and sharpened at their outer ends, a stripper plate formed with slots for receiving said rows of blades and extended beyond the sides and ends of said blades, said stripper plate having arms at its sides extended over the sides of the body and slotted, and upwardly extended flanges at its ends, a connecting bar at each side of the body having its ends extended through the slots in said arms and into the body, means for detachably securing said bars to the body, and means for yieldingly holding the stripper plate away from the body, said means comprising two springs made of flat spring metal engaging the upper surface of the stripper plate and having looped portions for engaging said flanges on the stripping plate and having its end portions bent inwardly toward each other to engage the under surface of the body, said springs being inserted between two rows of cutting blades to limit their lateral movement.

HARRY S. ELLIOTT.